United States Patent [19]

Yasui et al.

[11] Patent Number: 4,917,207
[45] Date of Patent: Apr. 17, 1990

[54] ENGINE MOUNTING ARRANGEMENT AND DRIVE MECHANISM FOR SMALL SNOWMOBILES

[75] Inventors: Toshihiro Yasui; Masanori Sugita; Tsuneo Isobe; Haruhiko Nakanosono, all of Iwata, Japan

[73] Assignee: Yamaha Hatsudoki Kabushiki Kaisha, Iwata, Japan

[21] Appl. No.: 162,179

[22] Filed: Feb. 29, 1988

[30] Foreign Application Priority Data

Mar. 4, 1987 [JP] Japan .................. 62-49057

[51] Int. Cl.⁴ .......................................... B62M 27/02
[52] U.S. Cl. ................... 180/193; 180/292; 180/312
[58] Field of Search ............ 180/190, 193, 312, 230, 180/292, 300

[56] References Cited

U.S. PATENT DOCUMENTS

| | | | |
|---|---|---|---|
| 3,673,884 | 7/1972 | Southiere | 180/190 |
| 3,773,126 | 11/1973 | Irvine | 180/193 |
| 3,821,994 | 7/1974 | Bergius et al. | 180/190 |
| 3,877,535 | 4/1975 | Gorski | 180/190 |
| 3,887,023 | 6/1975 | Henning | 180/193 |
| 4,023,635 | 5/1977 | Teal | 180/190 |

FOREIGN PATENT DOCUMENTS 166722 7/1986 Japan ................... 180/300

Primary Examiner—Charles A. Marmor
Assistant Examiner—Eric Culbreth
Attorney, Agent, or Firm—Ernest A. Beutler

[57] ABSTRACT

An improved drive unit and suspension arrangement therefor for a small snowmobile having an open tubular frame. The drive unit includes an internal combustion engine and a pulley type transmission. The pulley type transmission is supported within a transmission casing and is affixed to the frame for rigidifying the frame. The suspension permits more vertical compliance than fore and aft compliance for vibration dampening without adversely effecting the rigidity.

4 Claims, 5 Drawing Sheets

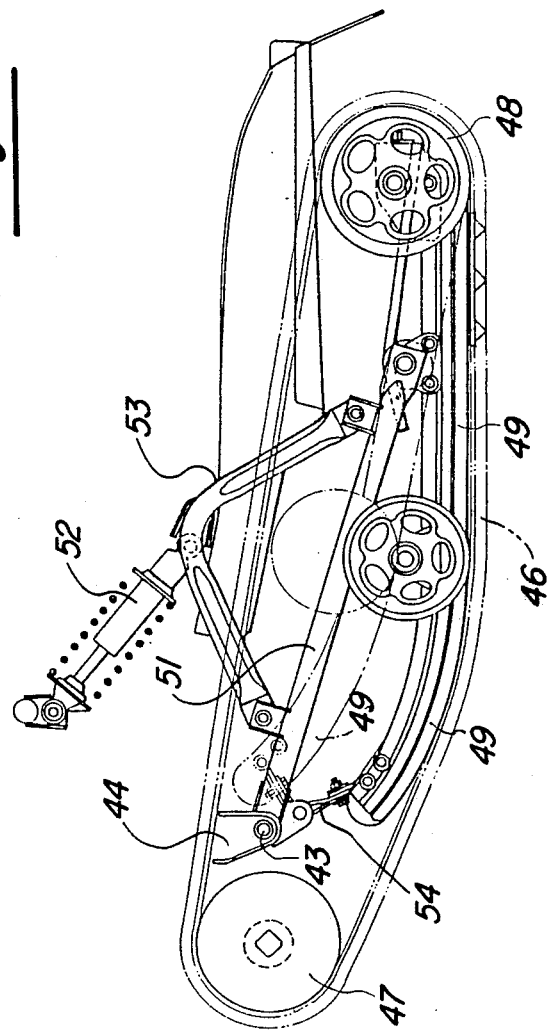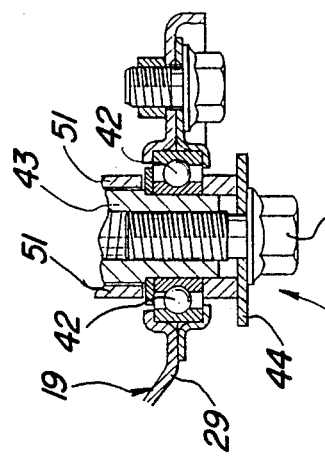

ENGINE MOUNTING ARRANGEMENT AND DRIVE MECHANISM FOR SMALL SNOWMOBILES

BACKGROUND OF THE INVENTION

This invention relates to an engine mounting arrangement and drive mechanism for small snowmobiles.

Recently it has been proposed to provide a small, light weight snowmobile that will have greater utility and maneuverability. Such small snowmobiles are designed to be operated primarily by a single rider and may be powered by an engine embodying a scooter type of transmission as is normally used for powering a motor scooter. In order for such a vehicle to suit its intended purpose, the vehicle should have a light weight.

Previously proposed light weight snowmobiles have employed a combined body frame arrangement made up of stamped and welded steel plates. Such arrangements, however, do have high weight and the cost of stamping and welding the steel plates can add significantly to the overall cost of the vehicle. On the other hand, if a light weight tubular frame is employed, the frame must be relatively complex in order to provide adequate strength and, furthermore, the open construction of such frames may place the engine and transmission in a location and with an exposure so that snow might adversely effect the mechanical components of the snowmobile.

It is, therefore, a principal object of this invention to provide an improved, light weight yet rigid snowmobile.

It is a further object of this invention to provide a light weight, strong and adequately protected snowmobile and drive arrangement for such a vehicle.

In connection with achieving the aforedescribed results, it is desirable to employ the engine and transmission as a structural member for the snowmobile. However, if the engine and transmission assembly is rigidly attached to the frame and body of the snowmobile, vibrations may be transmitted to the rider and other structure of the snowmobile that could adversely effect performance and the desirability of the vehicle.

It is, therefore, a still further object of this invention to provide an improved arrangement for suspending a powering engine in the frame of a vehicle.

It is a further object of this invention to provide an improved suspension arrangement for the engine transmission assembly of a snowmobile wherein high strength can be achieved and yet vibrations are effectively dampened.

SUMMARY OF THE INVENTION

A first feature of the invention is adapted to be embodied in a drive mechanism for a compact snowmobile having a frame that carries pin means disposed centrally of the frame and extending transversely. Support arms are hinged to the pin means and extend rearwardly to suspend a driving track. A drive unit is supported within the frame forwardly of the driving track. In accordance with this feature of the invention, the drive unit includes an engine having an output shaft that rotates about an axis that is parallel to the axis of the pin means and which drives a drive shaft through a pulley. The engine output shaft, drive shaft and pulley are all accommodated within an integral case.

Another feature of the invention is adapted to be embodied in an arrangement for suspending powering engine in the frame of a vehicle which suspension arrangement comprises an annular bushing adapted to be affixed to one of the engine and the frame. A pin member extends into the annular bushing in spaced relationship thereto and is affixed to the other of the engine and the frame. Elastomeric means are interposed between the pin member and the bushing and provide substantially more compliance in a vertical direction than in a horizontal direction for resisting fore and aft movement of the engine relative to the frame while permitting controlled relative vertical movement.

Yet another feature of the invention is adapted to be embodied in a suspension arrangement for a snowmobile that has a frame. An engine has an output shaft extending transversely across the frame and is suspended within the frame. Transmission means have an input shaft that is driven by the engine output shaft and an output shaft that is driven by the input shaft and which extends parallel to the engine output shaft. The vehicle is also provided with a drive belt for powering the vehicle and means are incorporated for driving the drive belt from the transmission output shaft. The transmission means comprises an outer housing affixed to and forming a unit with the engine. The suspension means comprises first means pivotally supporting the engine transmission unit for pivotal movement to the frame about an axis that is disposed contiguous to and parallel to the transmission output shaft. Resilient second means are spaced from the first means and resiliently suspend the engine transmission unit from the frame.

BRIEF DESCRIPTION OF THE DRAWINGS

FIG. 7 is an enlarged cross-sectional view of the area encompassed within the circle 7 in FIG. 4.

FIG. 8 is a side elevational view showing the drive belt and its suspension.

DETAILED DESCRIPTION OF THE PREFERRED EMBODIMENT OF THE INVENTION

Figure 1:
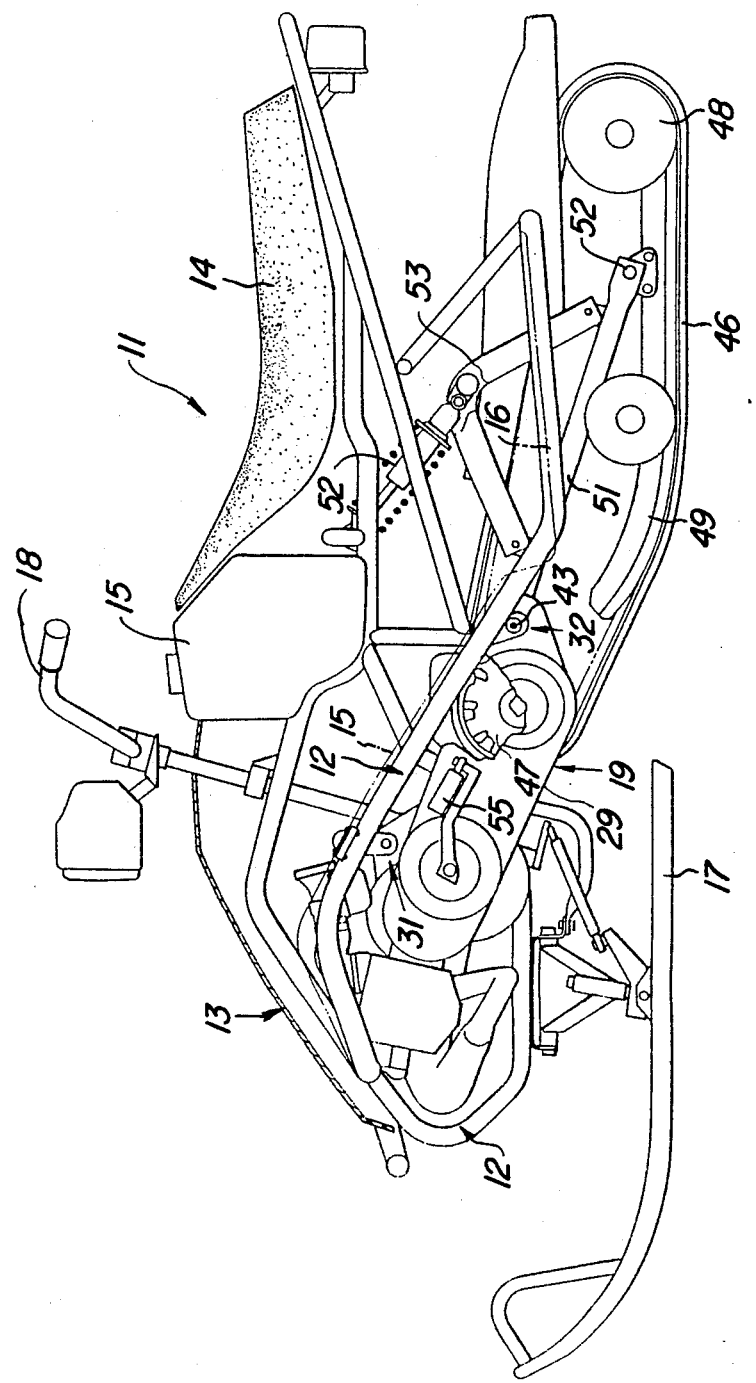
FIG. 1 is a side elevational view of a small snowmobile constructed in accordance with an embodiment of the invention, with a portion of the body broken away.
Figure 2:
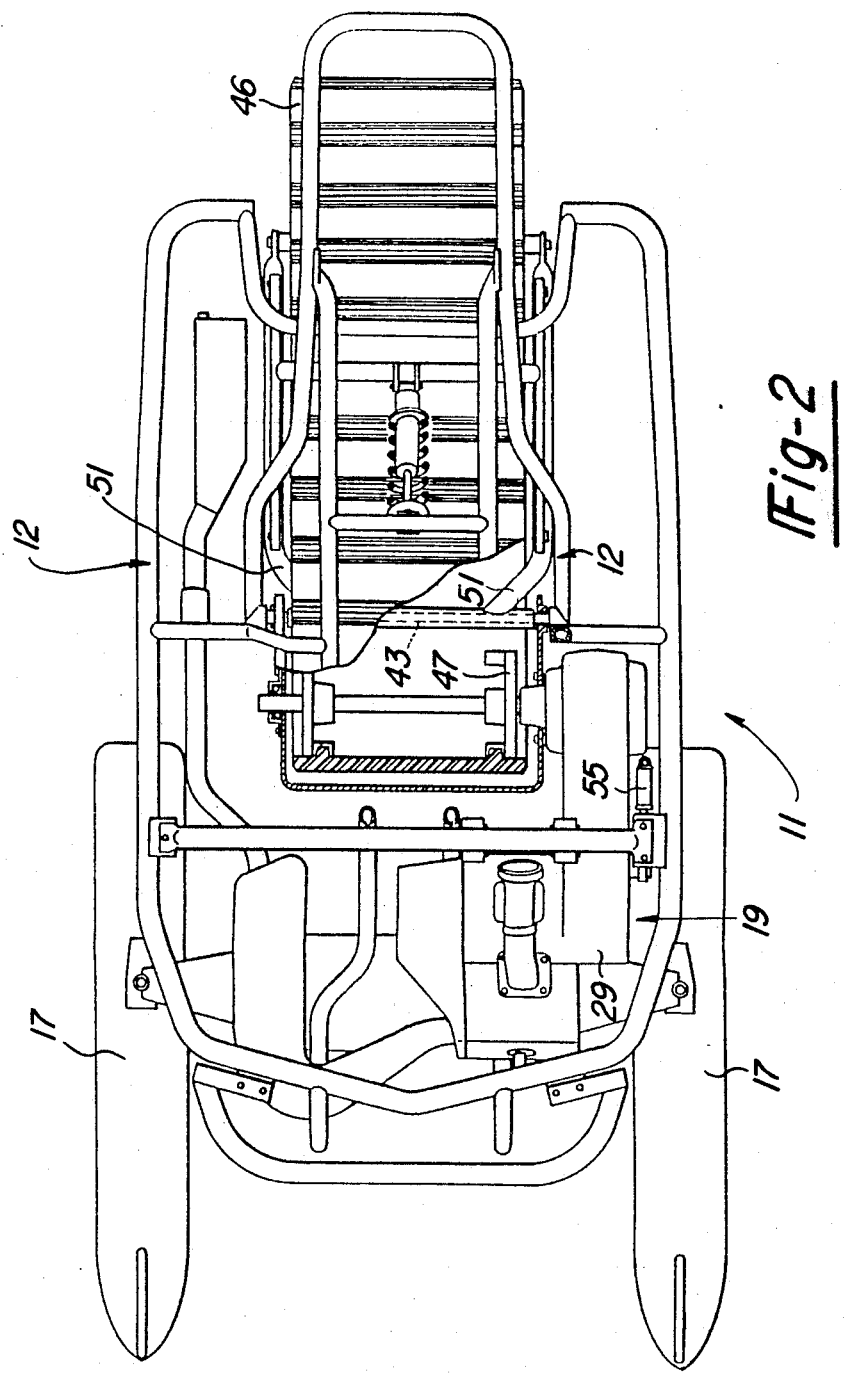
FIG. 2 is a top plan view of the snowmobile with the body removed and a portion of the drive mechanism broken away.

Referring now in detail to the drawings and primarily to FIGS. 1 and 2, a small snowmobile constructed in accordance with an embodiment of the invention is identified generally by the reference numeral 11. Although certain facets of the invention have utility in other types of vehicles, the invention has particular utility in connection with small snowmobiles of the type designed to be operated primarily by a single rider and which are powered by a relatively small power unit of the type normally used in vehicles such as motor scooters.

The snowmobile 11 includes a frame assembly, indicated generally by the reference numeral 12 and which is of the welded up tubular type. The frame assembly 12 includes a number of interconnected tubular frame members, only certain of which will be described, so as to provide a relatively light weight and yet rigid construction. A body 13 which may be preferably formed from moulded fiberglass or the like and which has a generally inverted cup shape is supported upon the frame 12. Because of its inverted cup shape, the body 13 may be positioned directly on the frame assembly 12 in overlying relationship to the drive mechanism, to be described. As a result, the body 13 does not add significant structural integrity to the snowmobile.

A seat 14 is positioned rearwardly of the body 13 on the frame 12. A fuel tank 15 is positioned on the frame 12 forwardly of the seat 14. The lower peripheral edge of the sides of the body 13 have been removed in FIG. 1 so as to more clearly show the construction. However, these edges are indicated in phantom at 15 and 16 so as to indicate the overall relationship of the body 13 relative to the frame 12 and running components.

A pair of front skis 17 are dirigibly supported by the frame 12 in a suitable manner. For example, the suspension arrangement for the front skis may be as shown in the copending application entitled "Frame Construction of Small Snowmobile," Ser. No. 162,733, filed March 1, 1988 in the name of Toshihiro Yasui et al, and assigned to the assignee of this application. The skis 17 are steered by means of a handlebar assembly 18 that is journaled on the frame assembly 12 in proximity to the front of the driver's seat 14.

Figure 3:
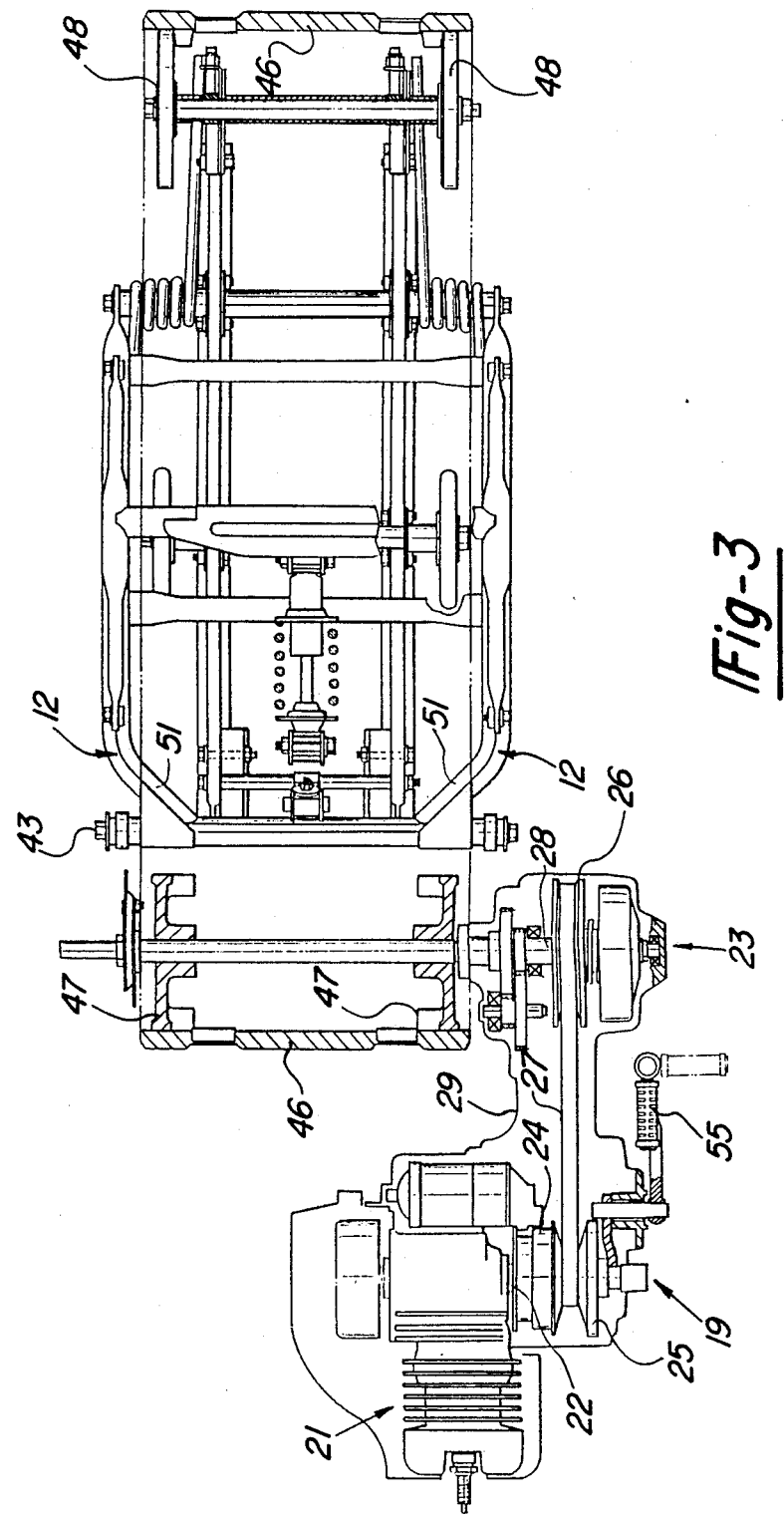
FIG. 3 is an enlarged top plan view, with portions broken away and other portions shown in section, of the powering unit and drive belt.
Figure 4:
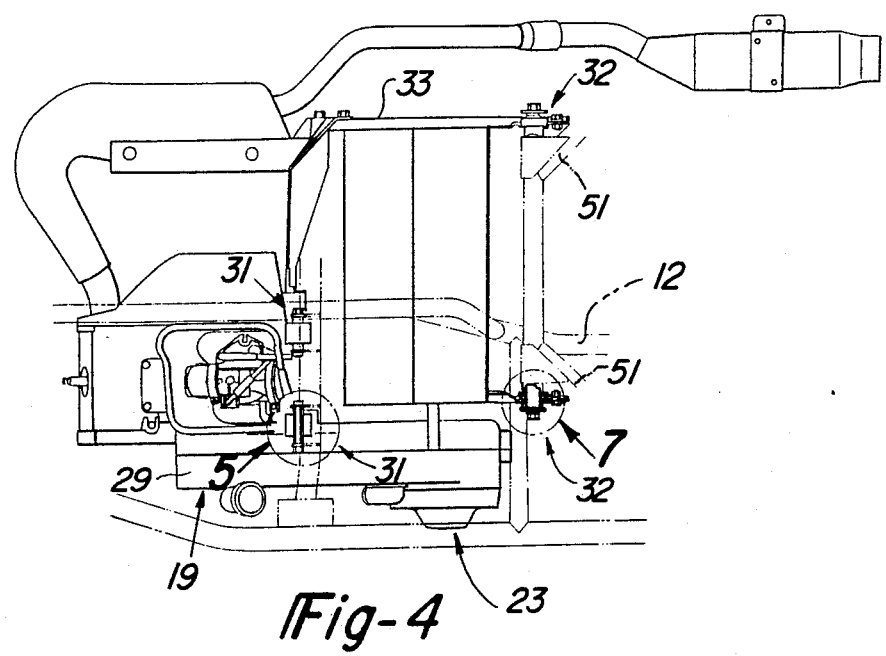
FIG. 4 is a reduced scale top plan view showing the engine and mounting arrangement.

The snowmobile 11 is powered by a power unit, indicated generally by the reference numeral 19 and which will be described now by particular reference to FIGS. 3 and 4. The power unit 19 may be of the type as normally used in a motor scooter or the like and is comprised of a single cylinder internal combustion engine 21 that is supported within the frame 12, in a manner to be described, with the axis of the cylinder of the engine cylinder block lying in a substantially horizontal plane and extending forwardly. The internal construction of the engine 21 may be of any known type, however, the engine 21 drives an engine output shaft 22 that rotates about a horizontally disposed axis that extends generally transversely to the longitudinal center line of the snowmobile 11.

The engine output shaft 22 drives a transmission indicated generally by the reference numeral 23 and which is of the variable speed type. In the illustrated embodiment, the transmission 23 includes a centrifugal clutch 24 which drives a variable diameter drive pulley 25. The drive pulley 25, in turn, drives a driven pulley 26 through a belt 27. The driven pulley 26 is, in turn, coupled in an appropriate manner to a drive shaft 28 for driving a drive belt, to be described.

The transmission 23 and engine output shaft 22 as well as a portion of the drive shaft 28 are rotatably journaled within a housing assembly 29 that is bolted or rigidly affixed to the exterior casing of the engine 21 so as to provide a relatively rigid assembly. This rigid assembly is, in turn, suspended within the frame assembly 12 in a manner to be described so as to further reinforce the frame construction and the overall rigidity of the snowmobile 11.

The suspension arrangement for the power unit 19 will now be described by particular reference to FIGS. 4 through 7. The power unit 19 is affixed to the frame assembly 12 by means of a pair of forward engine mount assemblies, indicated generally by the reference numeral 31 and by means of a pair of rear engine mount assemblies, indicated generally by the reference numeral 32. It should be noted that the engine mount assemblies 31 are provided at one side between the transmission casing 29 and the frame 12 and at the other side between a casting of the engine 21 and the frame 12. In a like manner, the connection between the rear engine mounts 32 and the frame 12 is, at one side, between an extension of the transmission housing 29 and at the other side by means of a bracket assembly 33 that is affixed to the engine casting in a suitable manner.

Figure 5:
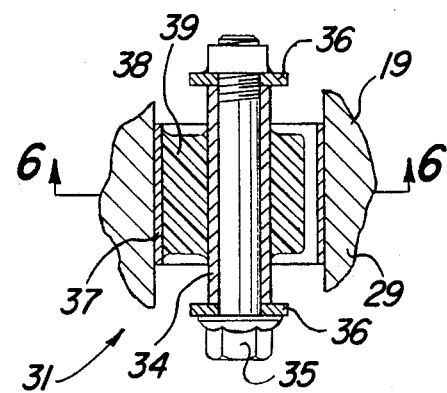
FIG. 5 is an enlarged cross-sectional view of the area encompassed within the circle 5 in FIG. 4.
Figure 6:
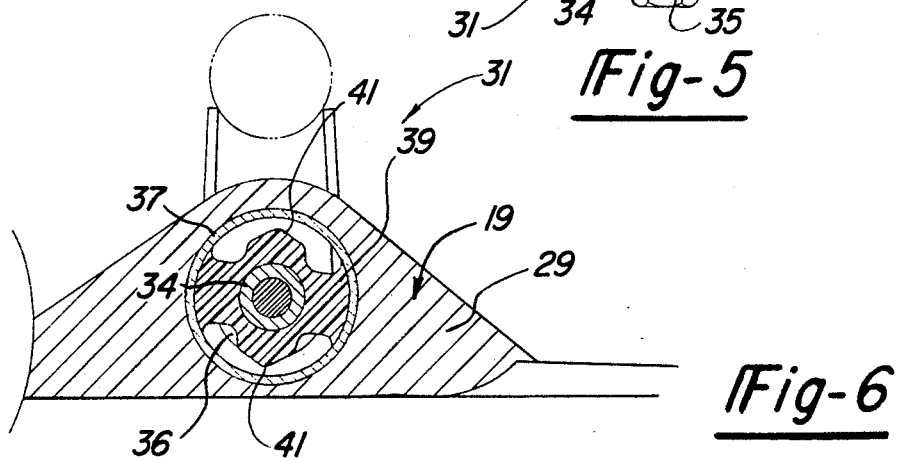
FIG. 6 is a cross-sectional view taken along the line 6—6 in FIG. 5.

Referring now primarily to the front engine mounts 31 they are depicted in FIGS. 5 and 6. FIGS. 5 and 6 show the engine mounts associated with the transmission casing 29. As noted above, a similar arrangement is provided between the engine casing and the frame. This mounting arrangement is comprised of a tubular sleeve 34 that is axially affixed to a bolt 35 which is, in turn, carried in a pair of depending brackets 36 formed in the corresponding side of the frame 12. The sleeve 34 extends through an outer sleeve 37 which outer sleeve is affixed in a suitable manner within a bore 38 formed in a boss of either the transmission housing 29 or the engine casting.

An elastic body 39 having a cross-sectional configuration as best shown in FIG. 6, is bonded between the inner sleeve 34 and outer sleeve 37. It should be noted that the elastic body 39 is comprised of a pair of ribs that extend generally in a horizontal direction and which thus provide relatively great rigidity in the fore and aft direction. A pair of stopper portions 41 extend transversely relative to these portions and are spaced from the outer sleeve 37 so that there will be substantially more resilience in a vertical direction. As a result, fore and aft rigidity is maintained while vertical movement of the power unit 19 is permitted so as to afford vibration damping. The amount of vibration damping will be limited by the contact of the stopper portions 41 with the outer sleeve 37 so that the movement even in this direction will be controlled.

Referring now to FIG. 7, the rear mounts 32 will be described. The mount illustrated in FIG. 7 is the mount that is positioned between the transmission casing 29 and the frame 12. As has been discussed above, at the other side the mount 32 is provided between the bracket 33 fixed to the engine casing and the frame. An anti-friction roller bearing of the ball type 42 is received within the transmission casing 29 and journals a tubular shaft 43. The shaft 43 is axially held in position between a pair of depending frame brackets 44 (one adjacent each mount 32) by means of respective bolts 45. The bolts 45 permit rotation of the tubular shaft 43 but preclude transverse movement of the shaft 43 relative to the brackets 44.

The construction provided by the mounts 31 and 32, as should be apparent, provides rigid mounting at the rear although some pivotal movement about the axis of the tubular shafts 43 is permitted. This movement is accommodated by the resilient members 39 and, as has been aforenoted, these members are more rigid in a fore and aft direction than in a vertical direction so as to lend rigidity to the construction and provide some vibration damping.

Referring now again to the drive mechanism for the snowmobile 18, the transmission 23 drives a toothed drive belt 46 of the type normally employed for powering such snowmobiles. To this end, there is affixed to the drive shaft 28 a pair of sprockets 47 that engage teeth formed on the inner surface of the drive belt 46 for driving it. In addition to the sprockets 47, the drive belt 46 is trained over a pair of rearwardly positioned idler sprocket 48 which are, in turn, journaled on guide rails 49. The guide rails 49 are suspended relative to the frame assembly 12 by means of a pair of trailing arms or links 51. The rear ends of the links 51 are pivotally connected to the guide rails 49 by means of pivot assemblies 52. At their forward ends, the links 51 are journaled upon the tubular shaft 43 as may be best seen in FIG. 7.

The movement of the drive belt 46 and guide rails 49 relative to the frame 12 is controlled by a single centrally positioned spring and shock absorber assembly 52 which is best shown in FIGS. 1 and 8. The shock absorber 52 is connected at one end to a member of the frame 12 and at its other end to a sub-frame 53 which is, in turn, affixed to the trailing levers 51. As a result, the pivotal movement of the trailing links 51 is controlled.

A strap 54 is trained around the forward ends of the guide rails 49 and a portion of the frame and specifically the brackets 44 so as to limit the movement of the guide rails 49 relative to the frame between the solid and phantom line positions shown in FIG. 8.

The engine 21 is provided with a kick starter 55 for facilitating starting. Alternative starting arrangements may, of course, be used.

It should be readily apparent from the foregoing description that a highly effective suspension arrangement is provided for suspending the drive mechanism of a small snowmobile and in which the power unit functions to cooperate with the frame for adding to its rigidity. It is to be understood that this description is that of a preferred embodiment of the invention and that various changes and modifications may be made without departing from the spirit and scope of the invention, as defined by the appended claims.

We claim:

1. A drive mechanism for a small snowmobile comprising a welded, tubular frame means, pin means disposed centrally of said frame means and extending transversely of said snowmobile, support arms hinged for pivotal movement relative to said frame means on said pin means and extending rearwardly from said pin means, a driving track pivotally supported from said support arms, and a drive unit disposed forwardly of said driving track and within said frame means, said drive unit comprising an engine output shaft and a drive shaft rotatable about axis parallel to the axis of said pin means, pulley means driving said drive shaft from said engine output shaft, an integral casing encircling said engine output shaft, said drive shaft and said pulley means and means for affixing said casing to said frame means for further rigidifying said frame means.

2. A drive mechanism as set forth in claim 1 further including a generally inverted cup shape body having a downwardly facing opening affixed to the frame means.

3. A drive mechanism as set forth in claim 1 wherein the means for affixing the integral casing to the frame means comprises first means pivotally supporting said integral casing to said frame means about an axis concentric with the pin means and resilient means for resiliently suspending said integral casing to said frame means forwardly of said pin means, said resilient means providing substantially more compliance in a vertical direction than in a horizontal direction for resisting fore and aft movement of said integral casing relative to said frame means while permitting vertical movement.

4. A drive mechanism as set forth in claim 3 further including a generally inverted cup shape body having a downwardly facing opening affixed to the frame means.

* * * * *